United States Patent [19]

Friesz

[11] 3,886,063
[45] May 27, 1975

[54] WET CONCRETE SEPARATOR

[76] Inventor: Reinhardt Friesz, 3635 S. Shaver St., Pasadena, Calif. 77504

[22] Filed: Sept. 1, 1972

[21] Appl. No.: 285,892

Related U.S. Application Data

[63] Continuation-in-part of Ser. No. 1,372, Jan. 8, 1970, Pat. No. 3,695,427.

[52] U.S. Cl. ................................ 209/44; 209/464
[51] Int. Cl. ............................................. B03b 7/00
[58] Field of Search ............ 209/464, 44, 2, 12, 13, 209/461, 462, 445, 446, 448–450, 173, 463

[56] References Cited
UNITED STATES PATENTS

| | | | |
|---|---|---|---|
| 1,286,554 | 12/1918 | Dekker | 209/173 |
| 2,054,671 | 9/1936 | Daman | 209/464 X |
| 2,189,418 | 2/1940 | Finney | 209/464 X |
| 2,336,991 | 12/1943 | Leveke | 209/464 |
| 2,491,912 | 12/1949 | Walker | 209/464 X |
| 2,559,403 | 7/1951 | Cover | 209/464 X |
| 2,983,378 | 5/1961 | Hilkemeier | 209/270 |
| 3,278,022 | 10/1966 | Moeschler | 209/2 |
| 3,596,759 | 8/1971 | King et al. | 209/2 |

FOREIGN PATENTS OR APPLICATIONS

| | | | |
|---|---|---|---|
| 836,649 | 1/1939 | France | 209/173 |
| 553,416 | 12/1956 | Italy | 209/464 |

Primary Examiner—Frank W. Lutter
Assistant Examiner—Ralph J. Hill

[57] ABSTRACT

A classifying separator discloses a settling tank means including the lower, rearward portions of two upwardly sloped conveyor housing means with conveyor means therein and having a common perforate wall therebetween. A perforate plate or screen is provided for the rearward escape of cement slurry from upward conveyance with rock-gravel, so that the cement slurry may overflow from the settling tank. The second conveyor means is provided for separately delivering sand separated by the perforated wall from the rock-gravel.

31 Claims, 27 Drawing Figures

WET CONCRETE SEPARATOR

CROSS-REFERENCE TO RELATED APPLICATION

This application is a continuation-in-part of Ser. No. 1372, filed Jan. 8, 1970, now U.S. Pat. No. 3,695,427.

BACKGROUND OF THE INVENTION

The invention relates to apparatus for receiving unpoured concrete mixture, in flowable state, from a concrete mixer, then to separate the cement slurry from the upwardly conveyed rock-gravel, to overflow from a settling tank means. The sand and rock-gravel may be separated by means within the apparatus, in more complex embodiments, or in simpler embodiments, the sand and rock-gravel may together be transferred upwardly, and discharged together, then to be separated by conventional shaker means.

A number of machines have been developed for the purpose of reclaiming the mixture of flowable, unhardened cement slurry, sand and rock-gravel from concrete mixers, as, at the end of the day, or at any cessation of concrete pouring from a concrete mixer. This results in avoiding the necessity of breaking out hardened material from concrete mixers before the concrete mixers can be put back in use, and it also amounts to a saving for re-usage of the remnant components of the mixture poured from concrete mixers during their operation.

In most recent developments, a machine has been developed which provides parallel extending, upwardly sloped, respective rock-gravel and sand conveyor housings, with helical type conveyors therein, with the conveyor housings starting rearwardly as parts of a settling tank. A perforate means, across the rock-gravel conveyor, and/or longitudinally extending therealong adjacent the sand conveyor housing, permits the cement slurry and sand to be back washed through its perforations, while inhibiting the rearward and/or sideward escape of rock-gravel, thus effectively separating the upwardly transported rock-gravel, while disposing the cement slurry and sand rearwardly toward the rear portion of the settling tank.

Also, there is back washing conducted downwardly above the sand conveyor housing. As, under these conditions, the cement slurry tends to "float", or otherwise tends to distribute itself generally in greater degree above a lower level of water into which the sand settles, the cement slurry tends to pass, at least in part under the force of back washing, rearwardly and/or sidewardly through perforations back into the settling tank portion associated with the rearward portion of the rock-gravel conveyor housing, while the sand tends to settle to the bottom of the essentially water containing, rearward portion of the settling tank containing the rearward portion of the sand conveyor housing, for the sand particles, settling to the bottom of a substantially clear water filled space, to be picked up by the sand conveyor helix or screw for upward transportation. In this type of machine the cement slurry overflows from a rear portion of the settling tank for further settling and/or processing, while the rock-gravel and sand are separately discharged from the upper, forward end of the machine, as for disposition for further usage.

It is thus a primary object of the invention to provide apparatus for receiving unpoured concrete, in flowable state, from a concrete mixer, then to separate the cement slurry, as over a wier, from the sand and gravel.

Also, a primary object of the part of the invention added as new is the provision of a separator with rock-gravel and sand conveyed upwardly from settling tank by separate, parallel extending conveyors, with sand and cement slurry screened and back washed rearwardly from rock-gravel conveyor housing, sand to sand conveyor, cement slurry for overflow rearwardly from settling tank.

Objects applicable to both old and new disclosures are:

It is also an important object to provide apparatus of this class which separates the gravel or rock from cement slurry and sand, and then separates the sand from the cement slurry, which is passed to a succession of settling tanks.

It is another important object of the invention to provide a less expensive and less complicated embodiment of the invention to meet less exacting service requirements, in which the cement slurry, as passed over a wier, is separated from both gravel or rock together with the sand, with these last two ingredients later to be separated, as by conventional shaker apparatus.

It is still an important and further object of the invention to provide apparatus and method of this class in which the products entering the initial vessel are back-washed whereby the cement slurry may overflow to have water and most moisture separated therefrom.

It is also an additional object of the invention to provide apparatus and method of this class with settlement tank included whereby the cement slurry may be successively diluted and divested of its water component, and the water recirculated.

BRIEF DESCRIPTION OF THE DRAWINGS

Other and further objects will be apparent when the specification hereinbelow is considered in connection with the drawings. The drawings repeated from the parent application are first described as follows.

The drawings added with the new part of this application, are described as follows.

Figures 1, 14:
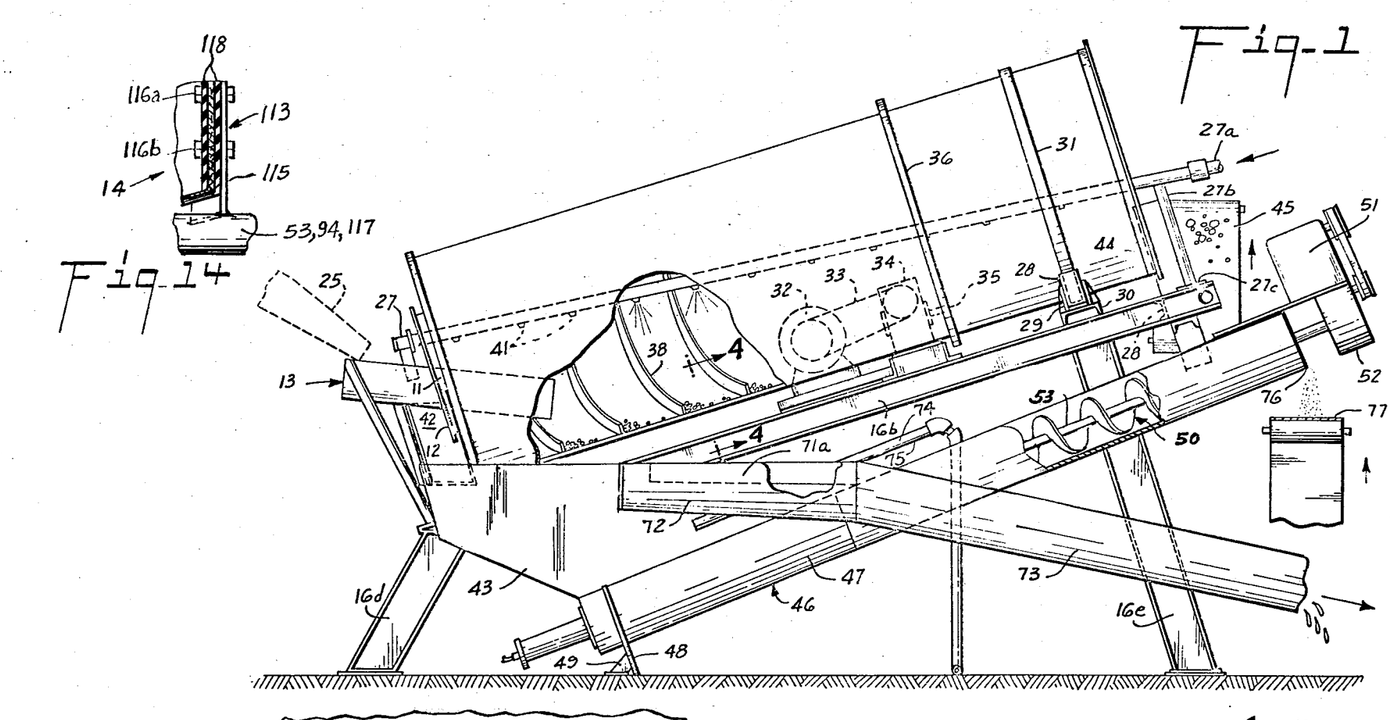
FIG. 1 is an elevational view, part in section, of the more complex form of the invention.
FIG. 14 is a fragmentary, enlarged elevational view, part in section, showing a modification of the lift helix and shaft construction shown in FIG. 13, and also applicable to the rock-gravel and sand lift helix of FIG. 9, and also to the sand lift helix of FIGS. 1 and 2.
Figures 2, 3, 5, 6:
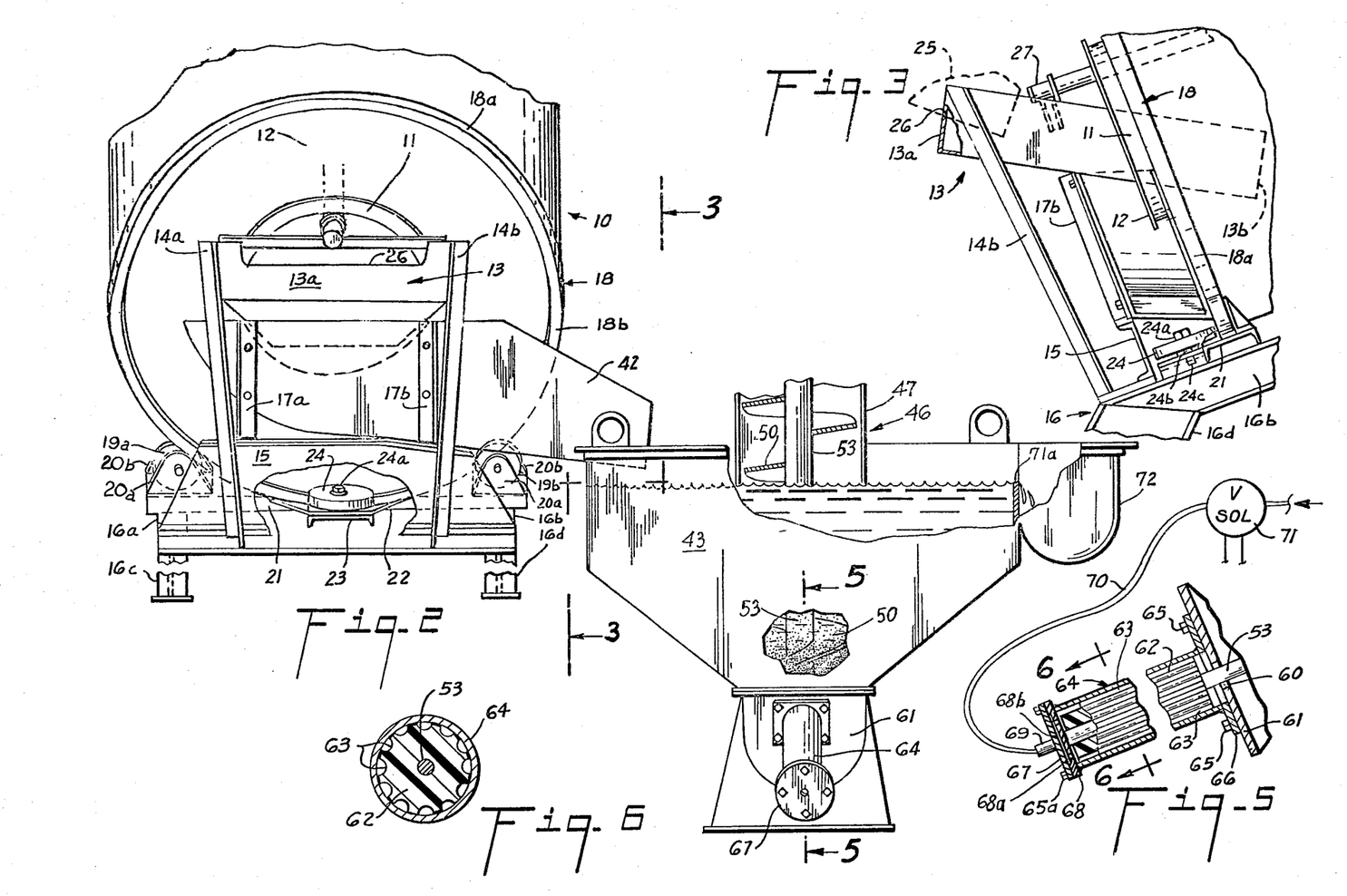
FIG. 2 is a transverse elevational view, to larger scale, viewing the rear of the apparatus shown in FIG. 1.
FIG. 3 is an enlarged, fragmentary, elevational view, taken along line 3—3 of FIG. 2, taken transversely through sand and slurry discharge chute.
FIG. 5 is an enlarged, fragmentary, longitudinal sectional elevational view, partially diagrammatic, taken along line 5—5 of FIG. 2, showing water lubrication of lower end of sand lift helix shaft.
FIG. 6 is an enlarged, fragmentary, longitudinal sectional elevational view, taken along line 6—6 of FIG. 5.

Making reference now to the drawings in which like reference numerals are applied to like elements in the various views, a form of the invention is shown in FIG. 1 as comprised first of a rotated drum 10 to receive a spout 13 thereinto through a rear end opening 11 as provided by a rear inlet flange 12; the spout 13 being fixedly disposed to extend from a rear, outer end 13a, FIGS. 1, 2, 3, as positioned by uprights 14a, 14b, and passed through the lower portion of the angle flange inlet 12, to bear thereupon, with discharge end 13b terminating a distance within the drum 10. A cross-channel 15 upstands across sloped, longitudinally spaced apart, runner channels 16a, 16b of the drum support frame 16, and uprights 17a, 17b upstand from the aforesaid cross-channel 15 for connection to the underside of the spout 13 to give it two point anchorage in longitudinal direction. The runner channels 16a, 16b connect at their lower ends, respectively, with sloped uprights 16c, 16d.

The rear end corner of the drum 10 includes a bearing angle 18 with side leg 18a bearing on each side near the lowermost portion against oppositely disposed rollers 19a, 19b with axles supported on respective pairs of brackets 20a, 20b, which are mounted on the opposed ends of a cross-channel 21 which extends across and slightly outwardly, on each side, of the respective runner channels 16a, 16b of the support frame 16. As indicated in FIGS. 2 and 3, there is rigidly connected to the cross-channel 21, centrally thereof, the upper edge of a gusseted bearing plate 22, a channel portion 23 being installed under the bearing plate 22, centrally thereof, with flanges extending longitudinally in turn to support the bearing plate 22 in depth, as gussets. A roller 24 has a hub 24a with under face to bear frictionally in rotation upon the bearing plate 22 as the roller peripheral areas bear successively in rotation against the lower leg 18b of the bearing angle 18 about the lower end of the drum 10. The axle 24b of the roller 24 has a head to bear upon the upper face of the roller, while the shank of the axle passes centrally through the roller 24, its hub 24a, the bearing plate 22 and the web of the channel portion 23, to be retained by a transverse pin 24c passed through the shank below the channel web.

As best shown in FIG. 3, the discharge spout 25 of a concrete mixer, in phantom lines, rests upon the relieved surface 26 of the rear end plate 13a of the fixed spout 13, when the concrete mixer, not shown, discharges the still flowable mixture of concrete, sand, rock-gravel, carried by mixing water, into the aforesaid fixed spout 13, from which it flows from the forward end 13b into the interior of the drum 10.

A wash pipe 27 extends through a front discharge opening 28 into the front of the drum 10, FIG. 3, and angularly downwardly and rearwardly through the drum 10 to pass out through the upper part of the rear opening 11, through the rear inlet flange 12. The rear end 27a of the wash pipe 27 is closed, and water enters the wash pipe from a conventional source of water supply 27d, as the wash pipe 27 is supported by a riser or pipe cradle 27b which upstands from the central portion of a cross-plate or member 27c across the forward portions of the runner channels 16a, 16b. The support frame 16 for the drum 10 provides a pair of forward sloped supports 16e, in alignment with the upright channel members 16c, 16d, FIG. 2, with tops to support the runner channels 16a, 16b thereon, as indicated by the support channel 16e shown supporting the forward portion of the runner channel 16b, FIG. 1. In addition to the cross-plate or member 27c, a cross-channel 27e, FIG. 1, is shown tying together the forward end portions of the runner channels 16a, 16b.

The uppermost portion of the drum 10 is supported by oppositely disposed rollers 28 carried by brackets 29 fixed to transverse channel 30. The rollers are disposed for supporting engagement with a structural support flange 31 defined about the exterior periphery of drum 10. Drum 10 is rotated on the rollers 19a, 19b and 28 by a motor illustrated in phantom at 32 in FIG. 1. Motor 32 is operative, through a suitable left drive 33 and reduction gear train 34 to impart driving rotation through a pinion gear 35 to a planetary gear 36 fixed to the outer periphery of drum 10.

Figure 4:
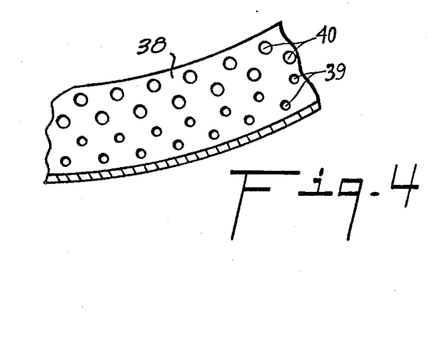
FIG. 4 is an enlarged, fragmentary, transverse elevational view, taken along line 4—4 of FIG. 1, showing drum helix construction to larger scale.

As the drum 10 is rotated by the motor 32, rock-gravel, sand and cement slurry mixture that has been dumped through the drum opening 11 by the spout 13 will be engaged by a perforated helix 38 that is fixed to the inner periphery of the drum, and will be carried upwardly toward the upper or discharge extremity of the drum. As viewed in greater detail in FIG. 4, helix 38 is provided with small perforations 39 adjacent the inner periphery of the drum that will allow passage of sand and cement slurry therethrough but will prevent passage of rocks and gravel. The helix also includes larger perforations 40 that will allow passage of coarse sand and slurry but prevent passage of rocks and gravel.

As the drum rotates, driving the helix 38, water is injected into the drum through a plurality of nozzles 41 formed in or otherwise fixed to the wash pipe 27. These nozzles 41 evenly dispurse the water on the rock-gravel, sand and cement slurry mixture as it travels upwardly and serves to wash the finer sand and cement particles downwardly through the helix perforations 39 and 40 to the lower sand and cement slurry discharge spout 42 which has fixed thereto the spout support uprights 17a and 17b which also support the inlet spout 13 thereon, as aforesaid.

Overflowing sand and cement slurry will flow through the spout 42 into a settling tank 43 while the washed rock and gravel will be carried upwardly by the helix 38 to the upper discharge extremity 44 where it is deposited on a conveyor belt 45 or other suitable means for transporting the rock and gravel to a receiving and storage facility therefor. A support frame 37 for the conveyor belt 45 is indicated diagrammatically as being provided on the far side of the drum 10, a channel beam 37a is indicated as being cantilevered from the aforesaid drum frame runners 16b, 16a, to the off side thereof, FIG. 1, as part of the frame 37, the drive 45a for the conveyor belt 45 also being indicated as supported from the off side support frame 37. The rock and gravel from the discharge 44 to the conveyor belt 45 may be delivered to a conventional vibration gravity classifier in order to separate the rock and gravel components of the mixture prior to storing them in respective facilities.

As the drum rotates, driving the helix 38, water is injected into the drum through a plurality of nozzles 41 formed in or otherwise fixed to the wash pipe 27. These nozzles 41 evenly disperse the water on the rock-gravel, sand and cement slurry mixture as it travels upwardly and serves to wash the finer sand and cement particles downwardly through the helix perforations 39 and 40 to the lower sand and cement slurry discharge spout 42 which has fixed thereto the spout support uprights 17a and 17b which also support the inlet spout 13 thereon, as aforesaid.

Overflowing sand and cement slurry will flow through the spout 42 into a settling tank 43 while the washed rock and gravel will be carried upwardly by the helix 38 to the upper discharge extremity 44 where it is deposited on a conveyor belt 45 or other suitable means for transporting the rock and gravel to a receiving and storage facility therefor. A support frame 37 for the conveyor belt 45 is indicated diagrammatically as being provided on the far side of the drum 10, a channel beam 37a is indicated as being cantilevered from the aforesaid drum frame runners 16b, 16a, to the off side thereof, FIG. 1, as part of the frame 37, the drive 45a for the conveyor belt 45 also being indicated as supported from the off side support frame 37. The rock and gravel from the discharge 44 to the conveyor belt 45 may be delivered to a conventional vibration gravity classifier in order to separate the rock and gravel components of the mixture prior to storing them in respective facilities.

In order to achieve separation of the sand and cement slurry mixture deposited via the discharge spout 42, into the settling tank 43, the settling tank is provided with a helix conveyor, illustrated generally at 46 that includes a generally U-shaped trough or housing 47 fixed to the wall structure of the settling tank and defining a portion of the bottom wall of the settling tank. A transverse brace 48 is fixed to the U-shaped housing and cooperates with a secondary or gusset brace 49 to provide a support fo both the settling tank 43 and the U-shaped housing 47. A helix conveyor 50 is disposed within the U-shaped housing for rotation by a motor 51 and suitable reduction gearing 52. As illustrated in detail in FIG. 13, the helix conveyor includes a shaft 53 about which is disposed a helix 54.

As illustrated in detail in FIGS. 5 and 6, the lower extremity of the helix conveyor shaft 53 extends through an opening 60 in the end wall 61 of the U-shaped housing 47. A bearing housing 64 is connected to the helix housing end wall 61 by a plurality of bolts 65 that extend through an end flange 66 of the bearing housing 64. A bearing element 62, indicated to be of plastic in FIGS. 5 and 6, is press-fitted into the bearing housing 64 and is thus nonrotatable to receive the helix shaft 53 for rotation therethrough. A thrust bearing plate 68 as of specially hardened alloy copper, is installed as outer end closure of the bearing housing 64, the end of the helix shaft 53 bearing on the inner face of the thrust bearing plate 68 while the bearing element 62 terminates slightly short thereof within the bearing housing 64. The periphery of the bearing housing 64 is fluked to provide a plurality of grooves 63 therein between the flukes; the thrust bearing plate 68 has perforations 68a therethrough and provides a recessed space 68b in the outer face thereof, all for purposes to be hereinbelow described.

The bearing housing 64 is provided with a closure plate 67 that is fixed to the bearing housing by bolts 65a and includes an injection conduit 69 through which water is injected in order to provide coolant for the bearing element 62 and rotated shaft 53. Water is injected under pressure from a suitable source, not shown, through a supply conduit 70 under control of a solenoid valve 71 which may be energized selectively or automatically as desired. The water, for lubrication, passes from injection conduit 69 through the closure plate 67, via space 68b and perforations 68a, into the bearing element grooves 63.

As the helix 50 is rotated by the motor 51, the sand and cement slurry that has been deposited, (dripped or splashed) into the settling tank will be thus further agitated. The finely carried cement is considered very close to the specific gravity of water, and its particles will readily separate from the heavier sand particles and will be carried with the agitated water to the upper portion of settling tank where it will exit through the wire 71a of an overflow slurry discharge spout 72 which is connected to a trough 73 adapted to transport the slurry material to appropriate settling basins therefor.

The sand, being denser than the slurry, will settle to the lower portion of the settling tank 43 and will be conveyed upwardly by the helix 50. A slurry wash pipe 74 is disposed above the housing 47 and includes a plurality of longitudinally spaced apart spray outlets lowermost therethrough, such as a succession of elongated spray slots 75 or other suitable spray nozzles, indicated diagrammatically in FIG. 1. Such sprays allow water to be sprayed in evenly distributed manner into the helix conveyor to wash the cement slurry from the sand and cause the slurry to flow downwardly back into the settling tank. Washed sand will exit at the upper discharge outlet 76 of the conveyor and will be deposited on the conveyor belt 77 or other suitable means for transporting the washed sand to a storage facility therefor.

Figure 7:
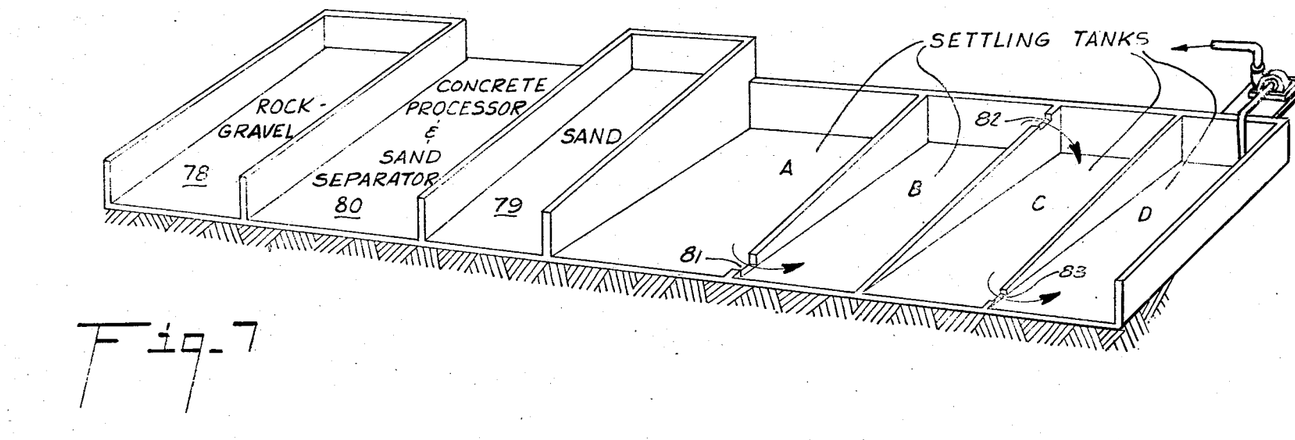
FIG. 7 is an isometric view showing relative location of separator mechanism shown in transverse elevation in FIG. 2, together with successive settling tanks for the cement slurry.

As illustrated in FIG. 7 a work station for the machine of FIG. 1 includes a rock-gravel bin 78 and a sand storage bin 79 that are disposed on either side of an area 80 in which is placed the classifying separator. Slurry settling basins A, B, C and D are provided to achieve final separation of the cement particles from the water in which it is suspended. Slurry is first deposited from the trough 73 into the basin A and as this basin fills the water exits through the opening 81 into basin B. Larger particles of the cement will remain in the settling basin A for final removal.

Figure 8:
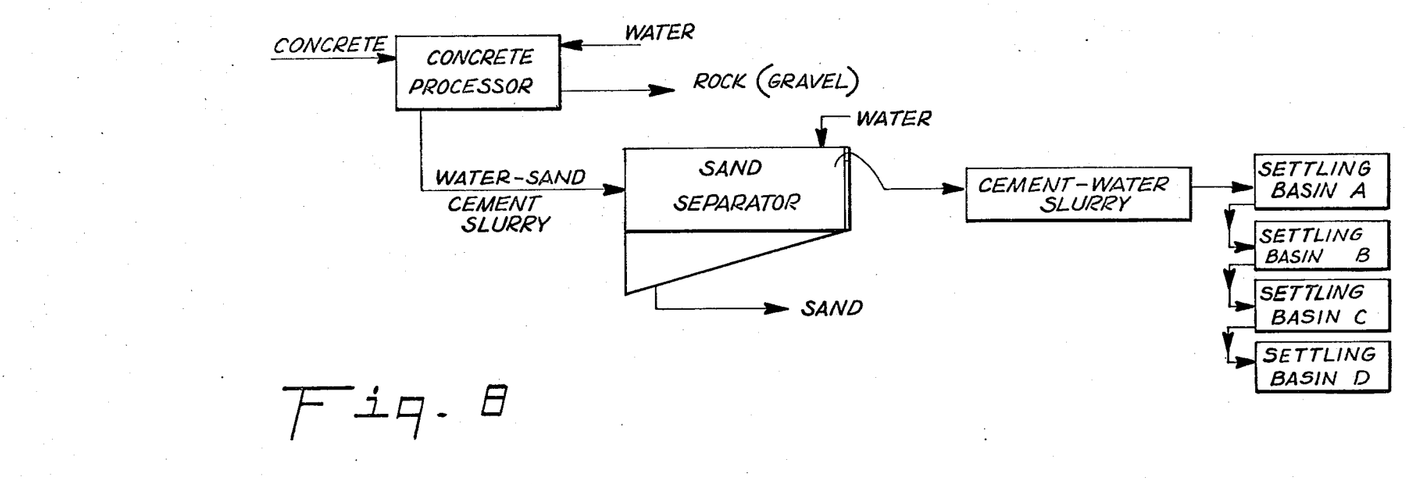
FIG. 8 is a flow diagram of the separation accomplished by the apparatus hereinabove described, as indicated diagrammatically in FIG. 7, and as hereinabove disclosed in FIGS. 1–6, inclusive.

Some of the smaller cement particles will be carried into compartment B where further settling will take place and water will flow serially through the openings 82 and 83 into the settling basins C and D. The entire classification separation process is schematically illustrated in FIG. 8. Explanation of phenomena may reside in theory that cement finely particularized, includes water in particle structure, so that particles have almost specific gravity of water, and float with slightest agitation. As particles adhere or coalesce water is free; therefore the cement particles contract as they unite, hence the heavier cement unions are denser and also the more massive or larger parts that settle earlier in the earlier settling basins. Thus, the slurry is lighter and lighter as it reaches the lower settling basins, and being so near the specific gravity of water, only ceases floating and settles in the lowest basin D after this basin becomes quite still, and then the settled cement is in very small parts.

Figures 9, 12:
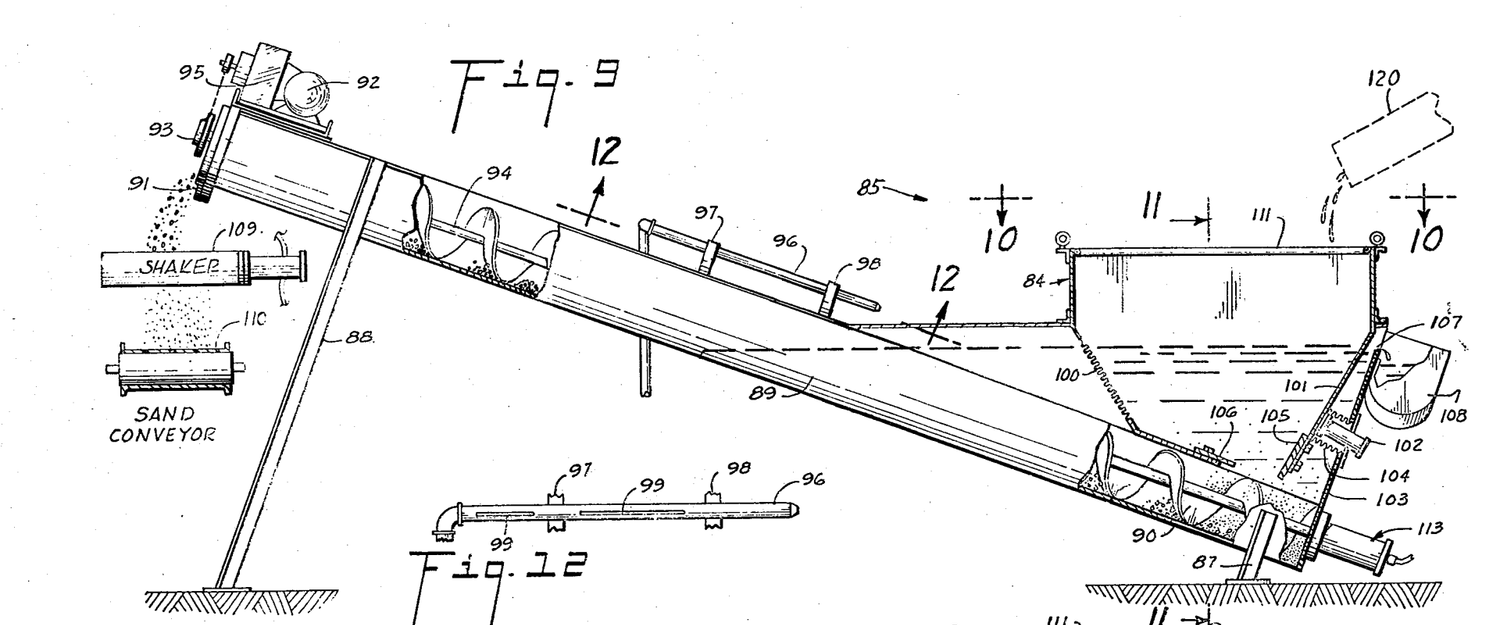
FIG. 9 is a longitudinal elevational view, part in section, of a less complex form of the invention than that shown in FIGS. 1–8, inclusive.
FIG. 12 is a fragmentary, enlarged bottom view, taken along line 12—12 of FIG. 9.
Figure 10:
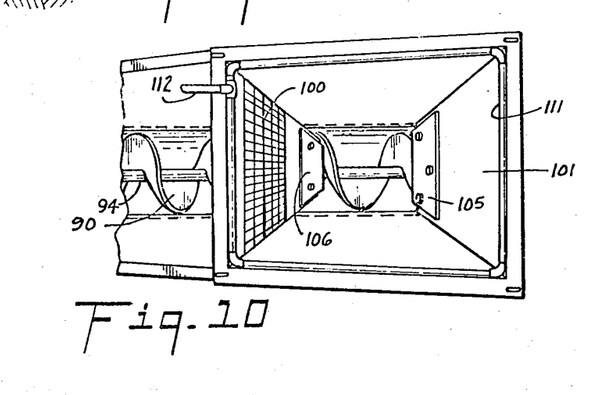
FIG. 10 is a fragmentary plan view, taken along line 10—10 of FIG. 9.
Figure 11:
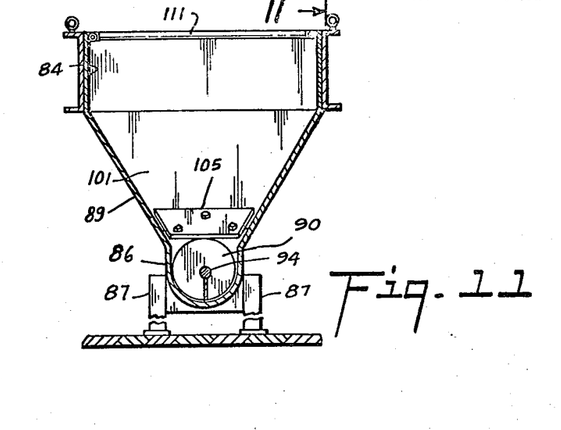
FIG. 11 is a fragmentary, transverse, sectional elevational view, taken along line 11—11 of FIG. 9.

With reference now to FIGS. 9, 10, 11 and 12, a simplified embodiment of this invention includes a classifier 85 including a settling tank or vessel 84 which receives rock-gravel, sand and cement slurry mixture from a concrete mixer discharge spout 120 shown in dotted lines, upper right, FIG. 9. The settling tank 84 is generally rectangular at its upper extremity and is tapered downwardly and inwardly at its sides to a generally U-shaped lower portion 86.

Braces 87 are fixed to the U-shaped portion of the settling tank and provide supports for one extremity of the separator while the other extremity thereof is supported by braces 88. The U-shaped bottom wall of the settling tank extends upwardly and defines a housing 89 in which is disposed a helical conveyor 90 for transporting rock-gravel and sand upwardly to a discharge opening 91. The helical conveyor is rotated within housing 89 by a motor 92 that energizes a pulley or sprocket 93 fixed to the conveyor shaft 94 through a suitable reduction gear mechanism 95. A bearing 113 of similar construction and operation as the bearing of FIG. 5 is provided to support the lower extremity of the shaft 94 of the helical conveyor. As the helical conveyor 90 is rotated, water is transported above the conveyor by a wash pipe 96 connected to the conveyor housing by brackets 97 and 98.

As illustrated in FIG. 12, the wash pipe is provided with elongated spray slots 99 that allow an evenly distributed spray of water to be injected under pressure into the conveyor along the length thereof. The water will wash the cement slurry from the rock-gravel and sand mixture thereby causing the slurry to flow downwardly back into the settling tank 84. Sand and other lightweight material carried downwardly by the water will be prevented from reentering the settling tank by a screen 100 or other appropriate filtering device that will allow passage of cement slurry therethrough.

As the partition 101 is vibrated and water is fed into the settling tank 84 by washing of the rock-gravel, the sand and slurry mixture is being conveyed upwardly as described hereinabove. The excess water and slurry mixture will flow through an overflow opening 107 and into a cement slurry discharge trough 108. The discharged slurry may flow from the trough 108 into a plurality of serially arranged settling basins in the manner discussed hereinabove. Simultaneously, washed rock-gravel and sand mixture will be conveyed upwardly to the discharge opening 91 where it will fall into suitable classification shaker means 109 for separation. Optionally both the rock-gravel and sand may be deposited directly on a conveyor belt 110 for transportation to a storage facility in mixed form as desired.

A cleaning conduit 111 is disposed at the upper extremity of the settling tank 84 and is communicated by a water supply conduit 112. The cleaning conduit is operative to supply water to wash the sides of the settling tank during operation of the machine and to supply sufficient water to achieve proper separation of the slurry from the other components of the mixture.

The settling tank 84 is also provided with a depending wall 101 that is fixed to the tank at its upper extremity, as aforesaid. A vibrating mechanism 102 is fixed both to the outer wall 103 of tank and to the depending partition 101 in order to achieve vibration of the depending partition to achieve supplemental agitation for optimum settling of the sand and other light weight particles of the mixture.

A protective bellows 104 surrounds the vibrating mechanism and protects it from contact with the mixture. An adjustment plate 105 is bolted or otherwise fixed to the depending partition 101 in order to allow adjustment of the degree of agitation that may be achieved from the partition. Adjustment of the effective size of the tank area subjected to agitation by the helix 90 may be achieved by adjusting an adjustment plate forming a wall structure immediately above the U-shaped bottom wall 86.

Figure 13:
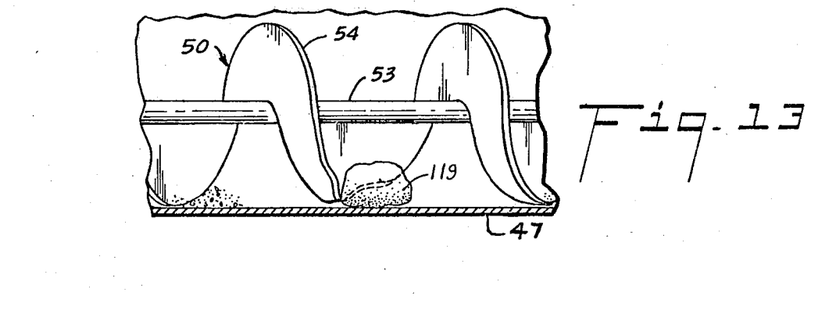
FIG. 13 is a fragmentary, enlarged elevational view, part in section; showing a lift helix and shaft construction, applicable to the rock-gravel and sand lift helix of FIG. 9, and also to the sand lift helix of FIGS. 1 and 2.

The helix conveyor 50 shown in FIGS. 1 and 2, is also shown in FIG. 13 as including a transfer element as the helix 54, indicated as being formed of a continuous spiral member or preformed plastic. Any conventional means may be employed to affix the helix 54 to the shaft 53, as by gluing. In FIG. 13 a substantial mass of set cement, or a piece of rock-gravel 119, is shown as having, through inadvertence, arrived at the position indicated, as in the settling tank 43, FIG. 2. Since the helix material 54 may be substantially yieldable or flexible, for instance, as some plastic materials are inherently. Thus helix 54 may yield to the rock-gravel or cement mass 59, so that it may pass thereby in a continued rotation, or else the helix conveyor 50 could be ruptured at some point due to such obstruction.

A modification of helix indicated by reference numeral 114 may be employed as a helix of some flexibility or yieldability, as illustrated in detail in FIG. 14. In this form of helix a plurality of helix supports 115 are fixed to the shaft 53 or 94, or to any other helix shaft 117 that may be employed with the inventions hereinabove described. Helix bolt openings receive bolts 116a, 116b, therethrough that fix helical laminations of elastomeric material 118 and fibrous material 119 against the helically projected bar or upright 115. The bars, posts or helix supports 115 are generally spaced apart one pitch distance or one complete convolution of the helix, but this spacing may be varied as requirements of performance may demand.

The elastomeric material and fibrous material may be any one of a number commercially available materials that serve to prevent excessive wear to parts subject to contact by abrasive materials. Obviously the elastomeric and fibrous lamination may quite easily be replaced when wear does occur in time thereby obviating the necessity for complete replacement of the helix. Although not illustrated in FIG. 14, the helix 113 may be composed of a plurality of helix segments that are joined in end to end abutment, thus a helix joint being completed by four bolts 116a (2) and 116b (2) on each post or upright 115. Obviously, in the event the helix 113 should become worn or damaged it is only necessary to replace the damaged segment through the use of ordinary tools.

Figures 15, 16:
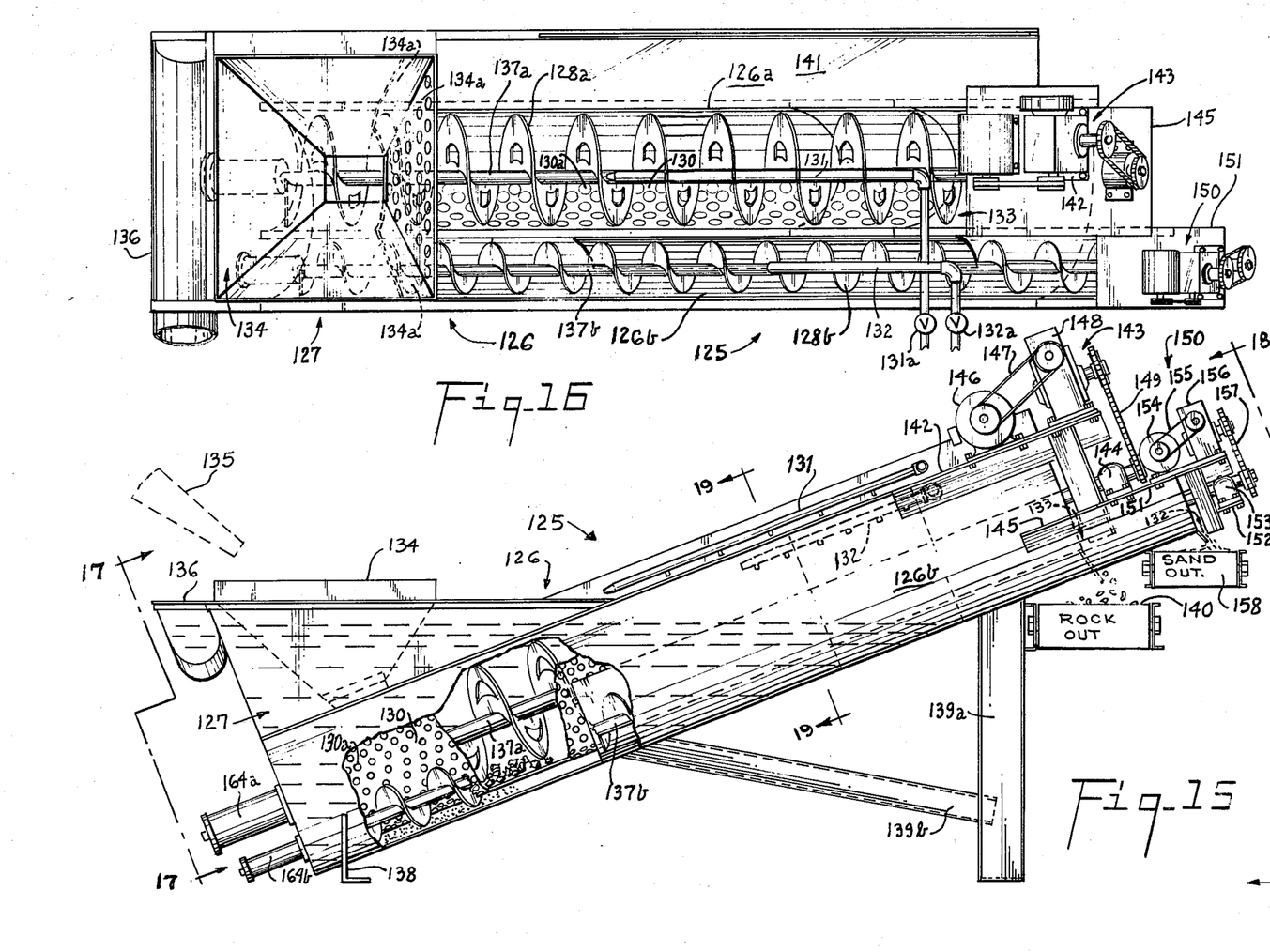
FIG. 15 is a side elevational view, part in section of a separator disclosing a preferred form of the invention.
FIG. 16 is a plan view of the separator shown in side elevation in FIG. 15.

Making reference to FIGS. 15–27, disclosing a preferred embodiment of the invention, a side elevational view of a separator 125 is shown in FIG. 15 with a conveyor housing 126 including or merging into a settling tank 127. From the settling tank end of the separator, the conveyor housing 126 extends diagonally upwardly, and is of cross-section best indicated in FIG. 19, forming a left section 126a for a relative large diameter helical conveyor 128a, and a right section 126b for a relative small diameter helical conveyor 128b.

Figures 17, 18, 19, 20, 21, 22, 23, 24, 25:
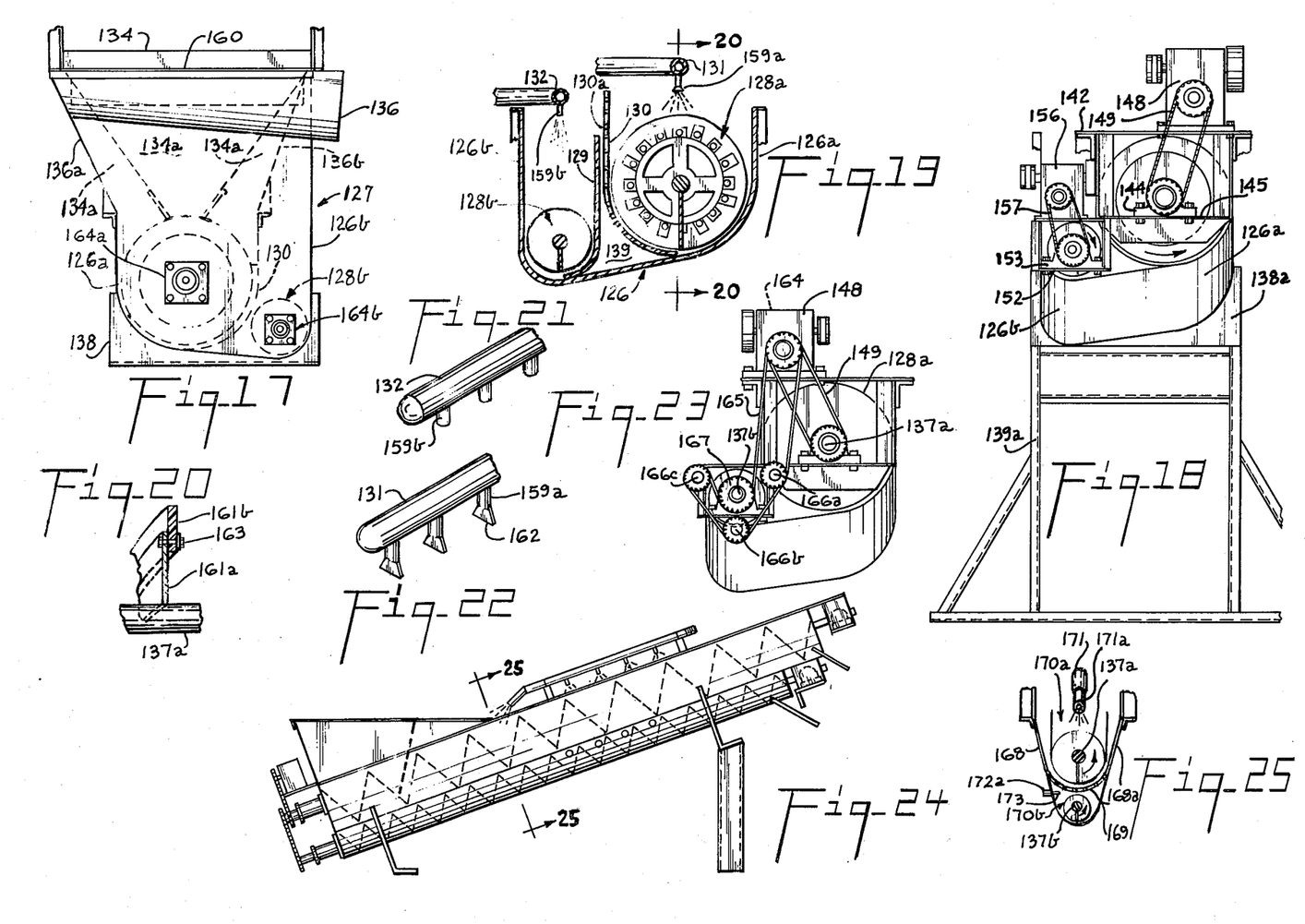
FIG. 17 is a rear end view taken along line 17—17 of FIG. 15.
FIG. 18 is a front end view taken along line 18—18 of FIG. 15, showing a two motor form of drive.
FIG. 19 is a transverse sectional elevational view, looking rearwardly, taken along line 19—19 of FIG. 15.
FIG. 20 is a fragmentary transverse sectional elevational view, looking to the left side of the separator, to show details of conveyor helix construction, taken along line 20—20 of FIG. 19.
FIG. 21 is a fragmentary isometric view, showing the lower end portion of a wash pipe having one form of nozzle construction.
FIG. 22 is a fragmentary isometric view, showing the lower end portion of a wash pipe having another form of nozzle construction.
FIG. 23 is a front end view, showing a single motor form of drive.
FIG. 24 is a side elevation view of another form of separator, differing from the separator shown in FIG. 15, in that the rock-gravel conveyor is disposed above the sand conveyor.
FIG. 25 is a transverse sectional elevational view, taken along line 25—25 of FIG. 24.

The inner side 129 of the right conveyor section 126b, extends from around under the conveyor 128b and up substantially vertically, as an imperforate plate, to an elevation above the right conveyor 128b, and to an elevation slightly above the axis of the left conveyor 128a. The inner side 130 of the left conveyor section 126a, extends from around under the conveyor 128a and up substantially vertically, as a perforate plate, to an elevation above the left conveyor 128a, thus to substantially the same elevation as the left and right outer sides of the conveyor housing 126. The relationships shown in this cross-sectional view, taken transversely along line 19—19 of the elevational view of FIG. 15, and thus looking rearwardly, are considered best to disclose critical relationships. These demonstrate that the larger conveyor, which at first moves cement slurry with both rock-gravel and sand therewith, upwardly from the settling tank area, while wash pipes 131, 132, above the respective conveyors 128a, 128b, deliver flushing water thereon, respectively, wash the cement slurry and sand through the perforations of the left conveyor inner plate 130, and wash rearwardly any cement slurry that otherwise might be carried upwardly in the substantially clear water in the right conveyor housing 126b that carries upwardly the sand particles that settle out in the lower end of the settling tank into the lower end of the right conveyor housing 126b.

As the larger conveyor 128a moves material upwardly, the backwashing moves the sand and cement rearwardly to pass in greater part through the perforations 130a in the plate 130, and down the interspace 139. As the perforations 130a in the plate 130 are of predetermined size to inhibit the rock-gravel parts or pieces from passing therethrough, while not thus inhibiting the cement slurry and sand, the larger conveyor continuously keeps delivering rock-gravel out of the outlet 133 at the upper end of the left conveyor section 126a onto a suitable rock-gravel receiving receptable, slide, or conveyor 140, best shown in FIG. 15.

As sand is lighter than rock-gravel, and tends to settle more slowly, and is so readily carried in suspension with cement slurry, there is an amount of sand constantly in circulation. Sand is thus in the hopper 134 forming the part of the settling tank 127 which receives the sand including material from the spout 135 that discharges into such hopper 134. As hereinabove described, such spout 135 generally may comprise the delivery spout of a conventional concrete mixer which, at the end of working, is found with some part of a batch of flowable cement slurry, sand and rock-gravel therein. It is not desireable to stop the cement mixer to leave the unpoured material therein to harden, thus requiring that it be laboriously broken out before the concrete mixer may be used again. Also, unpoured cement slurry carries sand and rock-gravel therein which can have further value, if reclaimed for further use.

The forward plate 134a of the hopper 134 is shown in FIG. 16 as a perforate plate above the conveyor 128a. Also, by broken lead lines in FIGS. 16 and 17, it is indicated that the perforate plate 134a may extend in coplanar extension across the settling tank 126 above the intersection of the plane of the plate 134a and a horizontal line passing through or slightly above the axis of the conveyor 128a.

In this regard attention is called to an imperforate plate 136b indicated in dotted lines and by dotted line lead line in FIG. 17 which defines the rightward extent of the perforate cross-plate 134a shown in FIG. 16 as defining the forward end of the material inlet or hopper 134. Correspondingly, the leftward extent of the perforate cross-plate 134a is indicated as terminating at the settling tank imperforate left side plate 136a. As hereinabove set forth, the necessity of extending the perforate plate 134a to left and to right of the hopper 134 is an optional feature, since the vast majority percentage of rock-gravel that may tend to return rearwardly will be opposed by the area of the plate 134a immediately above the conveyor 128a. The settling tank 126 is indicated in FIG. 17 as having outwardly the right side plate 126b with lower portion thereof forming the right or outer side of the conveyor housing for the sand conveyor 128b. Noticeably, in this rear view the plate 129 defining the inner side of the sand conveyor housing, shown in FIG. 19, does not appear, since it terminates well above the rear end of the settling tank 127, see FIG. 15.

The mixture of cement slurry, sand and rock-gravel is thus channelled to pass upwardly through the lower portion of the space of round cross-section defined by the helical conveyor 128a, and after it passes under the perforated plate 134a and upwardly, the rock-gravel is inhibited by the perforate plate 134a, as aforesaid, and by the perforate inner, longitudinally extending side plate 130 of the conveyor housing section 126a, from passing respectively rearwardly and sidewardly to reach the settling tank 127. Thus the rock-gravel is channelized away from any rearward return to the settling tank 127, or from any return to the settling tank 127 down the passage space 139 between respective conveyor housings 126a, 126b.

Noticeably the plate 129 forming the inner side of the right (sand) conveyor housing 126b, does not extend all the way rearwardly, but terminates well up in the upper portion of the settling tank 127, FIG. 15. On the other hand the perforate plate 130 forming the inner side of the left (rock-gravel) conveyor housing 126a does extend to the rear end of the settling tank 127 as indicated in FIGS. 15 and 16.

Features of construction, FIGS. 15-18, include a trough 136 along the top, rear, of the settling tank 127, into which its slurry runs over to be transferred on to settling basin means, to be hereinbelow described. Also, the respective shafts 137a and 137b of the helix conveyors 128a, 128b, (left and right), have their lower end portions journalled in, and lubricated through bearing housings 164a, 164b, of construction in correspondence with the bearing housing (and assembly) hereinabove described, as designated by reference numeral 64, FIG. 5.

The rear, lower portion of the separator 125, or its settling tank 127, is received for support by a large structural angle 138 having its upper leg specially relieved to the lower portion configuration of the settling tank, as best shown in FIG. 17. Forwardly the separator 125 is supported by a frame structure shown in FIG. 15 as comprised of upright 139a, which also supports the rock-gravel conveyor 140, and of diagonally extending brace 139b, between the upright 139a and the central, under portion of the separator 125. Designated features are valves 131a, 132a, controlling the admission of wash water to the respective wash pipes 131, 132.

As indicated in FIG. 16, a platform plate or deck is shown as provided outwardly of the left conveyor housing section 126a, such access platform or apron structure being generally designated by reference numeral 141. A support base 142 for the drive assembly 143 for the left conveyor shaft 137a is shown in FIGS. 15 and 16 as mounted generally for support from the forward or upper end portion of left conveyor housing section 126a. The forward or upper end of the left helix conveyor shaft 137a is journalled in a pillow block 144 on a lower base or support plate 145 that is supported in turn forwardly of, and by the forward end portion of the left conveyor houing section 126a.

Drive is transmitted to the left conveyor shaft 137a from a drive motor 146 on the upper base 142, by way of pulley belt transmission 147, to a gear reduction unit 148, also mounted on the upper base 142. Thence, from the gear reduction unit 148, drive is transmitted to the upper end of the shft 137a, hereinabove described as mounted on the lower base 145, by means of a pulley belt drive connection assembly 149.

In FIGS. 15 and 16, a separate drive assembly 150 is shown provided to drive the right helix conveyor shaft 137b for separated sand delivery. In this case upper and lower support bases 151, 152, are provided, as in turn supported from the forward or upper end portion of the right conveyor housing section 126b. The forward, upper end portion of the right conveyor shaft 137b is journalled in a pillow block 153, mounted on the lower base 152. A drive motor 154 on the upper base 151 transmits drive through a pulley belt transmission 155 to a gear reduction unit 156, also on the upper base 151. Thence, from the gear reduction unit 156, drive is transmitted down to the upper end of the shaft 137b, by means of a pulley belt drive connection assembly 157. A sand conveyor 158 is indicated, partially diagrammatically in FIG. 15, as attached for support to the under side of the right conveyor housing section 126b, this conveyor thus receiving the separated out sand dropped thereupon from the right conveyor housing section 126b, to be conveyed on for further disposition. In the front view of FIG. 18 the upright structure designated by reference numeral 139a in FIG. 15, is designated by such reference numeral 139a in FIG. 18 as applicable to a frame assembly, generally of upright members. A support member 138a is also shown in this view as supported by the frame structure 139a, the member 138a being relieved to receive therein for support the conveyor housing sections contours 126a, 126b.

The gist of success with this modification of the invention is best depicted in FIG. 19 which, in a graphic cross-section, shows that the left helix conveyor 128a may be conveying rock-gravel, together with sand-bearing slurry, upwardly. However, note that the inner side of the left conveyor section 126a comprises a perforate plate 130 for substantially the whole length thereof, with perforations 130a of substantial size or diameter, to let slurry pass the inner left conveyor section plate or wall 130 into the interspace 139, the slurry path of travel determines effective slurry separation from the rock-gravel, as such separation is abetted by the backwash water from the washpipe 131, as such is sprayed downwardly through the washpipe spray nozzles 159a onto the left helix conveyor 128a.

The wash water thus added through these nozzles 159a, and through the nozzles 159b of the washpipe 132, onto the right (sand) helix conveyor 128b, insures that there is continuous overflow of the lighter slurry constituency (with some heavier slurry components carried therewith), over the weir comprised by the back plate 160 of the settling tank 127. As additional flowable concrete is poured from mixers through spout 135 into the hopper 134, the overall thickness, weight or density of the combination of elements to be separated is increased, to be diminished thereafter by washpipe backwashing. In all cases the heavier slurry constituency is first carried upwardly by the left helix conveyor 128a, constantly to pass rearwardly and sidewardly through the perforate plate 130 and into, and down the interspace 139.

As shown in FIG. 20, the helix coil plate 161a of the left helix conveyor 128a, may mount a slightly flexible, or slightly yieldable rear or pliant coil portion 161b, as of a fibrous, rubber, or plastic material. In this case the lower or inner portion of the pliant coil portion 161b is affixed to the outer portion of the coil plate 161, as by conventional bolt and nut means 163. The innermost surface of the coil plate 161a is indicated as being fixed to the left helix conveyor shaft 137a, as by welding.

Considering FIGS. 21 and 22, FIG. 21 depicts to larger scale the washpipe 132, having end shown swaged closed, the spray nozzles for the washpipe water comprising simple cylinders 159b as shown to small scale in FIG. 19. FIG. 22 depicts to larger scale the washpipe 131, the spray nozzles 159a having their lower or discharge portions swaged or spread to form spouts 162, thus to provide a greater spread of washpipe water dispersion in the larger, left helix conveyor 128a.

As shown in FIG. 23, a single drive motor 164 may be provided to drive both the left helix conveyor shaft 137a and the right helix conveyor shaft 137b. In this case, from a gear reduction unit 149, as driven by a motor 146 correspondingly as shown in FIG. 15, the gear reduction unit 148, through the pulley belt transmission 149, transmits drive to the left helix conveyor shaft 137a, that turns the conveyor 128a that delivers separated out rock-gravel to a suitable conveyor, as the conveyor 158, FIG. 15, which carries it on for further distribution.

Through a more complex pulley belt transmission 165, drive from the same, or from a correspondingly mounted gear reduction unit pulley, is transmitted through idler members 166a, 166b, and 166c, to drive the pulley 167 on the outer or upper end of the right helix conveyor drive shaft 137b, in the same direction of rotation as the left helix conveyor shaft 137a is driven.

As shown in FIGS. 24 and 25, a different arrangement of helix conveyor drive shafts 137a, 137b is shown, in which a modified U- or modified V-shaped housing 168 is separated in cross-section into an upper portion 168a by a perforate, arcuate partition plate 169 below the upper (rock-gravel) helix conveyor 170a, and above the lower (sand) helix conveyor 170b. In this case an upper, large diameter washpipe 171 carries spray nozzles 171a directed to disperse washpipe spray water in a wide pattern over the upper helix conveyor 170a. On the other hand, washpipes 172a, b, c and d are indicated in FIG. 24 as directed transversely through a side of the housing 168 below the perforate partition plate 169, to deliver washpipe spray water, through nozzles 173, FIG. 25, to wash the lower (sand), smaller helix conveyor 170b.

Noticeably, in both the form of invention hereinabove described with relation to FIGs. 15–23, and in the form of invention described with relation to FIGS. 24 and 25, the same effect is obtained. That is, the slurry is separated from, and diluted away from the rock-gravel, while the slurry, as diluted, passes and in degree settles rearwardly, and in a portion of the space of rearward settlement the right, or smaller helix conveyor, starts moving upwardly slurry, water, and sand partly settled from the slurry.

Under washing in ascent, more of the slurry is washed back rearwardly, while the amount of sand moved along the lower portion of the right conveyor housing section 126b, heavier in some degree than slurry, keeps building up. By the time the upper end portion of the right conveyor housing section 126b is reached, at, and above the liquid or water level in the slanted or upwardly sloped separator 125, the lower or smaller conveyor 128b is moving substantially all sand. As to the slurry, its movement in the structure of FIGS. 24 and 25 is substantially as described for slurry movement in the structure of FIGS. 15–23, in that the slurry is constantly washed downwardly and rearwardly, passing through the partition plate perforations 174 into space above the lower conveyor 128b, corresponding with the interspace 139, FIG. 19. In this case such a vaguely defined space, in fact existence, merges with the space at least in part transversely covered by the helix of lower (sand) helix conveyor 128b. However, outwardly of such area there is more and more rearwardly settling of the water diluted slurry, and more and more settling of sand particles from the slurry to the bottom of the housing 168. In cases of both of the hereinabove described modifications of parallel extending conveyors, with communication thereacross or thereinbetween, a studied circulation, complex at first blush, results in positive separation of the components of flowable concrete mixture, rock-gravel being delivered upwardly, parallel with but separated from sand, and slurry, diluted, passing over the rear plate of the separator, as a weir, for further disposition, as settling.

Figures 26, 27:
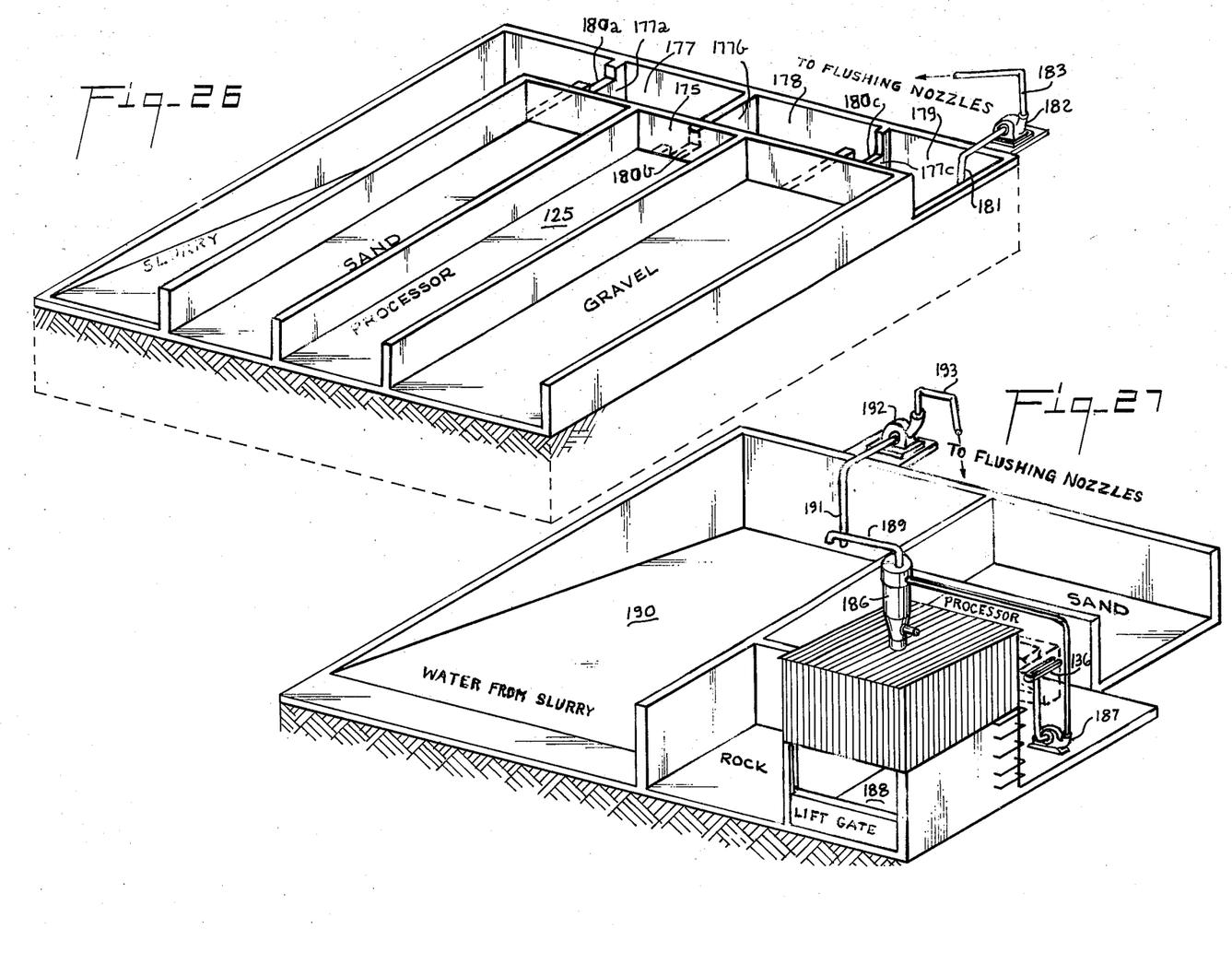
FIG. 26 is an isometric view, partially diagrammatic, showing one form of mixture component distribution, including water recirculation.
FIG. 27 is an isometric view, partially diagrammatic, showing another form of mixture component distribution, including cement reclamation and water recirculation.

In FIG. 26 an arrangement of tanks, basins, mounting space, and a succession of settling tanks is shown, where the PROCESSOR, or separator 125, FIGS. 15–25, is mounted between a SAND storage yard or area to left and a GRAVEL or rock-gravel storage yard or area to right, the forward or upper portion of the PROCESSOR or separator 125 being in direction of, or supported by a cross wall 175. To the left of the SAND area, a SLURRY pit is shown, sloped downwardly and forwardly, and in this case fluid flow intercommunication is established between the overflow trough from the PROCESSOR or separator 125, and the SLURRY pit, so that overflow slurry is dropped thereinto.

Across the forward end portion of the separation support area 176, and forwardly of the cross wall 175, a succession of settling basins 177, 178 and 179 are provided, with weir gates or slots in longitudinally extending, respective partition walls 177a, 178a and 179a, staggered alternately forwardly and rearwardly, as the respective weir gates 180a, 180b and 180c are shown in FIG. 26. As these gates are successively lower in elevation, from left to right, the calculated result will be that the forward right corner basin 179 will provide upwardly substantially clear water.

As water in itself can be a saving, the substantially clear water above the residually settled slurry in the last settling basin 179 can be picked up by the suction pipe 181 of a suitable pump 182 and recirculated through discharge line 183 to the wash pipes 131, 132, as backwash water. Thus, in effect, a fluid system in correspondence with a closed system may be effectually created.

In particular, one great advantage of this invention is that it eliminates the unsightly and useless occupation of space by the residual contents of concrete mixers, now necessary at the end of each day's run. This is necessary under present conditions, as otherwise, if the mixture is allowed to harden within a mixer, such mixer is rendered out of order until the hardened remnants can be removed. In greatest advantage, the savings in sand and rock-gravel can more than pay for the cost of such a machine in short order, whereas there results also a saving in lot space, as no unsightly and expansive piles of emptied out concrete mixer residual components can stack up from day to day.

An alternate arrangement of PROCESSOR, with SAND, ROCK (GRAVEL) and SLURRY water areas is shown in FIG. 27, with a slurry pump 187 being shown connected to the trough 136 which receives overflow slurry from the separator 125 or PROCESSOR. The slurry pump 187 takes suction from the bottom of the trough 136 through a suction pipe 184 and its discharge pipe 185 discharges it upwardly and then horizontally to a conventional cyclone or clone 186, shown diagrammatically. The clone 186 is shown in FIG. 27 as mounted centrally upon a filtration or settling box 187 through which the residual slurry, substantially dried of all water and moisture, settles through to stack up in a dry slurry chamber 188 therebelow. A LIFT GATE is shown to be raised to give access to the dry slurry for its removal and further disposition, from time to time. From the top of the clone 186 a discharge line 189 is shown extending over to drop the water separated from the slurry into a tapered SLURRY water basin 190. From the deeper end of this slurry water basin 190 the suction line 191 is entered.

A pump 192, through the suction line 191, picks up the water from the slurry and delivers it through a discharge line 193 to wash pipes, as the wash pipes 131, 132 shown in FIGS. 15—25. Thus, another system is provided of still greater compactness, which eliminates settling basin space.

The invention may be practiced in a variety of forms and arrangements, with the structures disclosed being by way of illustration and not to be considered as limitations upon the broad spirit of the invention, while the number of appended claims are felt to be no more than exemplary of claims falling within new combinations.

I claim:

1. The method of classifying rock-gravel, sand, and cement slurry, comprising the steps of, discharging the aforesaid constituents, while in an admixed flowable state, into a container; diluting said constituents in said container; conveying the admixture forwardly and upwardly by a large conveyor means to pass under a perforate forward wall of the container for part of the sand and cement slurry to pass rearwardly back into the container through the forward wall perforations; passing sand and cement slurry through a perforate separation means sized to retain rock-gravel and interposed between said large conveyor means and another smaller conveying means parallel with the large conveyor means and extending into the container; carrying the rock-gravel, by means of the larger conveying means, upwardly above the slurry and sand level therein and discharging said rock-gravel from the upper, forward end of the larger conveying means; and carrying the sand, by means of the smaller conveying means, upwardly above the slurry and sand level therein and discharging said sand from the upper, forward end of the smaller conveying means; the slurry overflowing from the container.

2. The method as claim in claim 1, wherein said dilution step includes the step of backwashing the slurry and sand while being conveyed upwardly and forwardly by the smaller conveying means.

3. The method as claimed in claim 1, wherein the dilution step includes the steps of backwashing the rock-gravel, slurry and sand while being conveyed upwardly and forwardly by the larger conveying means; and separately backwashing the slurry and sand while being conveyed upwardly and forwardly by the smaller conveying means.

4. A classifying separator comprising a conveyor housing and a receiving and settling tank adapted to receive unpoured rock-gravel, sand and cement slurry in unhardened flowable mixture thereinto, said conveyor housing comprising a lower portion of said tank and extending upwardly from a rear end of said settling tank in inclined position and having therein parallel extending, first and second rotatable helix conveyors with the lower extremities thereof extending into said settling tank, a first outlet provided at the upper end of said conveyor housing for the outward delivery therethrough of rock-gravel from said conveyor housing, and a second outlet provided at the upper end of said conveyor housing for the outward delivery therethrough of said from said conveyor housing, screen means extending across said settling tank intermediate the length of said conveyor housing for inhibiting the settling into the rearward end of said settling tank of rock-gravel started upwardly by said first conveyor, separate means for the respective receipt of rock-gravel and of sand at delivery through respective outlets, and for respective transfer for further disposition, washing means for flushing cement slurry from the sand and rock-gravel being conveyed upwardly and to wash said cement slurry into said settling tank, said screen means defining a barrier to allow cement slurry to flow rearwardly into said settling tank while simultaneously inhibiting the flow of rock-gravel thereinto, said settling tank having an overflow provided in said rear end and an overflow receptacle means disposed to receive the overflow of cement slurry therefrom.

5. A classifying separator as claimed in claim 4 in which said conveyor housing includes a first conveyor housing and a second conveyor housing slightly spaced therefrom, the side of said first conveyor housing adjacent said second conveyor housing comprising a perforate plate whereby cement slurry and sand from said first conveyor housing may pass therethrough into the space therebetween and via said space to said settling tank, slurry for overflow therefrom and sand to be picked up by said second conveyor.

6. A classifying separator as claimed in claim 4, in which said helix conveyor helices are installed about shafts, with each shaft having a bearing therefor in a bearing housing accessible from the rear end of said settling tank, said bearings and bearing houses cooperatively providing lubrication passages with water inlets thereto for the circulation of water through said lubrication passages.

7. A classifying separator as claimed in claim 4, in which said washing means comprises spray nozzle equipped, flush pipe means for spraying water downwardly upon said conveyors forwardly of said settling tank for the back washing of cement slurry and sand from said rock-gravel conveyor, and for the back washing of sand rearwardly and for the back washing of cement slurry in the settling out of the sand for upward conveyance by said sand conveyor.

8. A classifying separator as claimed in claim 4, in which conveyor helix construction includes resilient wear means fixed to helix outer portions.

9. A classifying separator as claimed in claim 4, with conveyor means including brackets fixed to included shaft means, and with helix construction comprising a plurality of helix segments fixed to said brackets for continuous helix formation, resilient material being removably fixed to continuous helix outer portions to provide wear surfaces.

10. A classifying separator as claimed in claim 4, which includes a plurality of settling basins for successively receiving cement slurry overflow, with degrees of cement settling taking place in each settling basin.

11. A classifying separator as claimed in claim 10, which includes means to pick up water from the last of said settling basins for re-circulation to said washing means.

12. A classifying separator as claimed in claim 4, which includes means to pick up overflow cement slurry for delivery to included clone means adapted to separate the cement from the water and a good part of the water content of the slurry.

13. A classifying separator as claimed in claim 12, which further includes settling basin means to receive the water and moisture that said clone separates from said cement, and which additionally includes means to pick up water from said settling basin means for re-circulation to said washing means.

14. A classifying separator as claimed in claim 4, in which said helix conveyors extend with rock-gravel conveyor above the sand conveyor.

15. A classifying separator as claimed in claim 4, in which said sand conveyor is spaced sidewardly and downwardly from said rock-gravel conveyor.

16. A classifying separator as claimed in claim 4, in which said overflow receptacle comprises a trough disposed to receive cement slurry overflowing from said tank, said settling tank also including a partition member connected at one end to said settling tank and with the other end extending freely into said settling tank to define a tortuous path for cement slurry to follow toward said trough, and means for vibrating said partition to provide for agitation of said cement slurry for final settling of small particles therefrom.

17. A classifying separator comprising a receiving and settling tank adapted to receive unpoured rock-gravel, sand and cement slurry in unhardened flowable mixture thereinto, and also including parallel extending, first and second conveyor housings sloped upwardly from a rear end of said settling tank to respective outlet providing discharge ends above said settling tank, first and second rotatable helix conveyors in said respective housings with conveyor respective lower ends disposed in respective rearward portions of said conveyor housings within the lower, rearward portion of said settling tank, said first conveyor including perforate plate means therealong forming its portion adjacent said second conveyor to permit the escape of sand and cement slurry therethrough into space between said conveyor housings while inhibiting the passage through said perforate plate of rock-gravel started upwardly by said first conveyor, washing means for flushing cement slurry and sand from the rock-gravel being conveyed upwardly by said first conveyor, and for flushing any cement slurry from water immersed sand being conveyed upwardly by said second conveyor, said settling tank having an overflow provided in said rear end and an overflow receptacle means disposed to receive the overflow of cement slurry therefrom, screen means extending at least across said first conveyor housing and above said first conveyor itermediate the length thereof for inhibiting the downwardly and rearwardly settling of upwardly started gravel into the rearward end of said settling tank.

18. A classifying separator as claimed in claim 17, in which said second conveyor housing includes an imperforate plate baffle on the side thereof adjacent said first conveyor housing and extending downwardly along the upper portion of the length of the second conveyor housing, whereby cement slurry passing through said perforate plate from said first conveyor housing is deflected from passing into said second conveyor housing above said settling tank, and whereby sand passing from said first conveyor housing through said perforate plate with said slurry is deflected downwardly to settle into said second conveyor housing in said settling tank to be picked up by said second conveyor for upward transfer.

19. A classifying separator as claimed in claim 17, in which said helix conveyor helices are installed about shafts, with each shaft having a bearing therefor in a bearing housing accessible from the rear end of said settling tank, said bearings and bearing houses cooperatively providing lubrication passages with water inlets thereto for the circulation of water through said lubrication passages.

20. A classifying separator as claimed in claim 17, in which said washing means comprises spray nozzle equipped, flush pipe means for spraying water downwardly upon said conveyors forwardly of said settling tank for the back washing of cement slurry and sand from said rock-gravel conveyor, and for the back washing of said rearwardly and for the back washing of cement slurry in the settling out of the sand for upward conveyance by said sand conveyor.

21. A classifying separator as claimed in claim 17, in which conveyor helix construction includes resilient wear means fixed to helix outer portions.

22. A classifying separator as claimed in claim 17, with conveyor means including brackets fixed to included shaft means, and with helix construction comprising a plurality of helix segments fixed to said brackets for continuous helix formation, resilient material being removably fixed to continuous helix outer portions to provide wear surfaces.

23. A classifying separator as claimed in claim 17, which includes a plurality of settling basins for successively receiving cement slurry overflow, with degrees of cement settling taking place in each settling basin.

24. A classifying separator as claimed in claim 23, which includes means to pick up water from the last of said settling basins for re-circulation to said washing means.

25. A classifying separator as claimed in claim 17, which includes means to pick up overflow cement slurry for delivery to included clone means adapted to separate the cement from the water and a good part of the water content of the slurry.

26. A classifying separator as claimed in claim 25, which further includes settling basin means to receive the water and moisture that said clone separates from said cement, and which additionally includes means to pick up water from said settling basin means for re-circulation to said washing means.

27. A classifying separator as claimed in claim 17, in which said helix conveyors extend with rock-gravel conveyor above the sand conveyor.

28. A classifying separator as claimed in claim 17, in which said sand conveyor is spaced sidewardly and downwardly from said rock-gravel conveyor.

29. A classifying separator as claimed in claim 17, in which said overflow receptacle comprises a trough disposed to receive cement slurry overflowing from said tank, said settling tank also including a partition member connected at one end to said settling tank and with the other end extending freely into said settling tank to define a tortuous path for cement slurry to follow toward said trough, and means for vibrating said partition to provide for agitation of said cement slurry for final settling of small particles therefrom.

30. A classifying separator as claimed in claim 17, which includes a tank mounted agitator to extend within said tank and connected to an agitating plate extending across said tank with the lower end free whereby to agitate the mixture flowing into said tank, thus stepping up the separation of the components to be settled out from said mixture.

31. A classifying separator comprising conveyor housing means and support means therefor, including settling tank means, said separator being adapted to receive unpoured rock-gravel, sand and cement slurry in unhardened, flowable mixture thereinto, said conveyor housing means comprising a first upwardly tilted conveyor housing with lower portion in fluid communication with said settling tank for cement slurry and sand disposition in said settling tank as said first conveyor housing includes a first helix conveyor rotatable therewith for the upward movement of rock-gravel to an outlet provided in the upper end of said first conveyor housing for the discharge of the rock-gravel outwardly therethrough by said first conveyor, said separator providing screen means to inhibit the rearward and downward passage of rock-gravel in said first conveyor while permitting the rearward and downward passage of cement slurry and sand and by way of said fluid communication into said settling tank, said conveyor housing means also comprising a second upwardly tilted conveyor housing with lower portion in said settling tank with said second conveyor housing having a second rotatable helix conveyor for the upward movement of sand settled into said second conveyor housing from cement slurry in said settling tank, said second conveyor housing providing an outlet from the upper end thereof for the discharge of the sand outwardly therethrough, said settling tank having an overflow provided therefrom, and an overflow receptacle means included by said separator and disposed to receive the overflow of cement slurry from said settling tank, said second conveyor being spaced sidewardly and downwardly from said first conveyor in transverse relationship; said conveyor helix construction including resilient wear means fixed to helix outer portions.

* * * * *

UNITED STATES PATENT OFFICE
CERTIFICATE OF CORRECTION

Patent No. 3,886,063            Dated May 27, 1975

Inventor(s) Reinhardt Friesz

It is certified that error appears in the above-identified patent and that said Letters Patent are hereby corrected as shown below:

Col. 16, line 10, "said" first occurrence should be --sand--.

Signed and Sealed this second Day of September 1975

[SEAL]

Attest:

RUTH C. MASON
*Attesting Officer*

C. MARSHALL DANN
*Commissioner of Patents and Trademarks*